United States Patent [19]

Grover et al.

[11] 4,053,193

[45] Oct. 11, 1977

[54] ROOM DIVIDER AND CABINET STRUCTURE FOR DENTAL EQUIPMENT

[76] Inventors: Richard K. Grover; Robert H. Larsen, both of Box 254, Grandville, Mich. 49418

[21] Appl. No.: 671,677

[22] Filed: Mar. 29, 1976

[51] Int. Cl.[2] ........................ A61C 19/02; A47B 77/08

[52] U.S. Cl. .................................... 312/209; 312/223; 312/228

[58] Field of Search ................ 312/209, 228, 229, 223

[56] References Cited

U.S. PATENT DOCUMENTS

| | | | |
|---|---|---|---|
| 893,155 | 7/1908 | Evans | 312/209 |
| 1,688,456 | 10/1928 | Dolph | 312/223 |
| 2,553,794 | 5/1951 | Staten, Jr. | 312/223 |
| 3,271,859 | 9/1966 | Horowitz et al. | 312/209 |
| 3,338,650 | 8/1967 | Ryan | 312/223 |
| 3,524,256 | 8/1970 | Barker | 312/209 |
| 3,530,513 | 9/1970 | Maurer et al. | 312/209 |
| 3,672,741 | 6/1972 | Clark | 312/223 |
| 3,920,299 | 11/1975 | Propst et al. | 312/223 |

*Primary Examiner*—Paul R. Gilliam

*Assistant Examiner*—Victor N. Sakran

*Attorney, Agent, or Firm*—Price, Heneveld, Huizenga & Cooper

[57] ABSTRACT

A cabinet structure for dividing one room into two dental operating areas and for permitting access to equipment stored in the structure from opposite sides includes an elongated, rectangular countertop, a lower storage and enclosure cabinet positioned below and supporting the countertop and an upper compartmentalized storage cabinet which extends the length of the countertop and divides the countertop into two work areas. Access is provided to the interior of both the lower and upper storage cabinets permitting use of the dental equipment stored therein from opposite sides of the cabinet structure.

8 Claims, 5 Drawing Figures

ROOM DIVIDER AND CABINET STRUCTURE FOR DENTAL EQUIPMENT

BACKGROUND OF THE INVENTION

This invention relates to cabinet structures and more particularly to a unique dental room divider which permits the use of the same dental equipment from opposite sides of the divider at a pair of spaced areas.

In the practice of dentistry it is fairly common and almost a necessity for a dentist to employ separate rooms in his daily practice. Each room is preferably provided with a dental chair and all the necessary equipment for the treatment of a patient. By employing at least two such rooms, the dentist is able to reduce the waiting period for each patient and is also able to make more efficient use of his limited time. Therefore, the efficiency of the practice, as well as the efficiency of treatment of the patients, is substantially increased by this form of practice.

Frequently, however, due to the high cost of modern dental equipment, a dentist is unable to fully outfit each of the required rooms. For example, each room would preferably include an X-ray unit, the various hand tools required in the treatment of patients, a supply of dental materials, an electrosurgery unit, an ultrasonic cleaning unit and a nitrous oxide unit. The above list of equipment, although not exhaustive, provides a representative sampling of the equipment normally required in the practice of dentistry. As previously mentioned, the capital expenditure involved in fully outfitting two, separate rooms is frequently not practical and further results in a needless duplication in equipment. This is especially true when only a single dentist is using both of the rooms. In such a system the expensive equipment employed is not efficiently used.

In an attempt to alleviate the problems heretofore experienced, at least one structure has been proposed. This structure is disclosed in U.S. Pat. No. 3,338,650 entitled DENTAL INSTRUMENT CABINET and issued to Ryan on Aug. 29, 1967. This patent discloses a dental instrument cabinet pivotally mounted between opposite sides of a hollow wall. A fairly complex drive and pulley system is employed to automatically pivot the cabinet so that access may be had to the instruments from opposite sides of the wall which separates two dental operating positions. The pivotally mounted dental instrument cabinet includes a front panel structure which has secured thereto suitable dental equipment connected by conduits to the required drive motors, air and water pumps, electrical outlets or power utility sources.

Although permitting use of the same dental hand tools from two, separated dental operating positions, the structure disclosed by Ryan is fairly complex in nature, requires extensive modification of an intermediate wall structure and only eliminates the duplication of some of the various hand tools employed by a dentist.

A need, therefore, exist for structure which permits use of and access to a wide variety of expensive dental equipment from two, spaced dental operating positions; which permits the division of an existing room into two working areas; and essentially eliminates other problems heretofore experienced in the customary practice.

SUMMARY OF THE INVENTION

The unique cabinet structure for dental equipment in accordance with the present invention serves as a room divider separating a single room into two dental operating positions and permits use of the same equipment from opposite sides of the divider. Essentially, the structure includes an elongated, generally horizontal countertop member which defines a work surface. A lower storage and enclosure structure is positioned below and supports the countertop. An upper, compartmentalized storage structure extends upwardly and longitudinally of the countertop and divides the top into two opposed work area. Provision is made for permitting access to both the lower storage and enclosure and the upper compartmentalized storage structures from opposite sides of the divider.

In one embodiment of the invention provision is further made for the support of a sink at diagonally opposed areas of the countertop. A support is also provided for a single X-ray unit positioned above the divider so that it may be used in both working areas on the opposite sides of the structure. Further, provision is made for connecting the various equipment storable in the structure to the required sources of electrical power, water, air, vacuum, oxygen, nitrogen and other such utilities required by the equipment.

DETAILED DESCRIPTION OF THE PREFERRED EMBODIMENT

Figure 1:
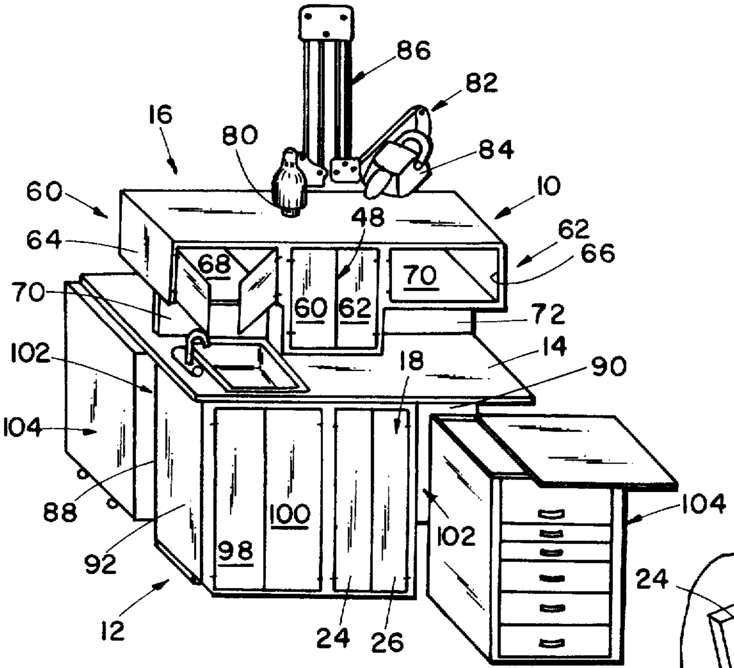
FIG. 1 is a perspective view of the unique cabinet and room dividing structure built in accordance with the present invention
Figure 2:
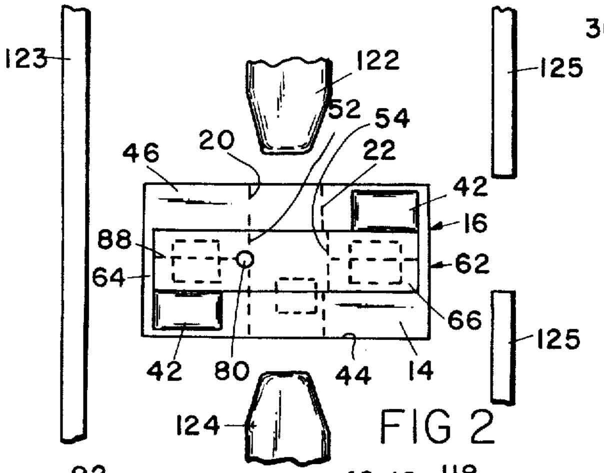
FIG. 2 is a reduced size top plan view of the unique structure illustrating the manner by which it divides a single room into two dental operating positions.
Figure 3:
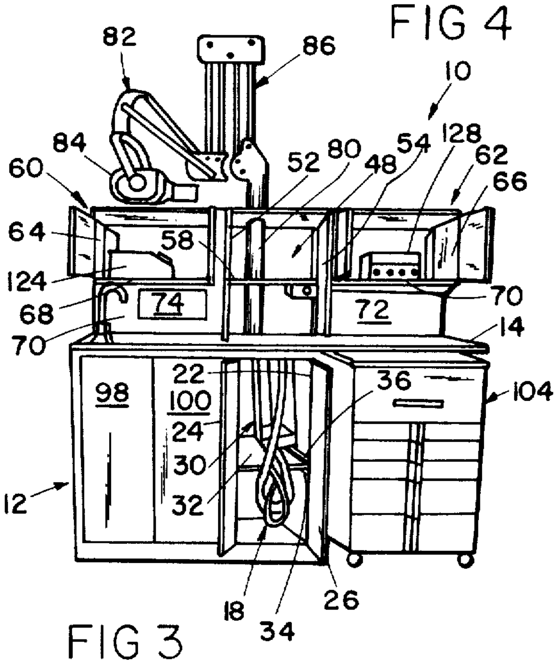
FIG. 3 is a side, elevational view of one side of the unique structure.

The unique room divider and cabinet structure for dental equipment in accordance with the present invention is illustrated in the drawings and generally designated 10. As best seen in FIGS. 1, 2 and 3, the dental room dividing cabinet structure 10 includes a lower storage and enclosure structure 12, a generally rectangular horizontally extending countertop or work surface 14 supported on the lower structure, and an upper compartmentalized cabinet structure 16. The lower enclosure 12 includes a central area 18 defined by the countertop 14 and sidewalls 20, 22. Access means in the form of doors 24, 26 are provided on both sides of the central enclosure 18. The doors, as best seen in FIG. 3, may be hingedly mounted to the sidewalls 20, 22 and are provided to permit access to a piece of dental equipment 30 from both sides of the divider structure 10. The piece of equipment 30 may, for example, be a nitrous oxide gas analgesia unit. Typical unit is supplied with a base plate 32 (FIG. 3). The unit 30 may be slidably mounted within the central enclosure by means of conventional drawer glides 34 received within guide structures 36 which are secured in a parallel, horizontal relationship on the inner surface of the sidewalls 20, 22.

Figure 4:
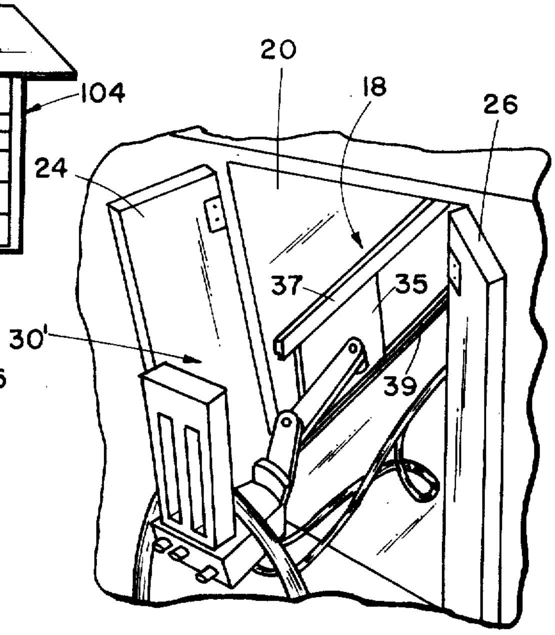
FIG. 4 is an enlarged, fragmentary, perspective view illustrating one arrangement for slidably mounting a piece of dental equipment within the cabinet structure.

In the alternative, the nitrous oxide analgesia unit may be in the form illustrated in FIG. 4 and designated 30'.

This piece of equipment is provided with a mounting plate 35. The mounting plate 35 may be slidably positioned between upper and lower grooved guides 37, 39 secured to the inner face of sidewall 20. With either arrangement, the particular piece of dental equipment is slidably mounted within the enclosure so as to permit ready access to and ready use of the equipment from either side of the divider structure.

The countertop 14 is preferably provided with washing facilities in the form of a pair of sink structures 42 positioned within apertures formed at diagonally opposed areas in the countertop 14. The upper, compartmentalized enclosure 16, besides providing a place for storage of dental equipment and general supplies, also divides the countertop surface into two opposed work areas 44, 46. In the preferred form, the upper enclosure 16 includes a central, vertical compartmentalized area 48 defined by a top member 50, sidewalls 52, 54, the countertop 14 and an intermediate shelf 58 (FIG. 3). Doors 60, 62 are hingedly mounted on the sidewalls 52, 54 on both sides of the enclosure to thereby permit access to the interior of the enclosure.

In the preferred form, the upper enclosure structure 16 is generally T-shaped and includes outwardly directed wing enclosures 60, 62. The wing enclosures are defined by end walls 64, 66 and bottom panels 68, 70. Positioned below and extending vertically from the countertop 14 are a pair of divider walls 70, 72. With this arrangement, the bottom panels 68, 70 provide a ready place for attachment of a tissue dispenser 74, as best seen in FIG. 3.

A support post 80 is built into the divider structure and extends upwardly from the bottom of the structure through the central enclosures. The support post is adapted to support an X-ray unit 82. The X-ray unit illustrated in the drawings is of a conventional design and includes a head 84 secured to an articulated arm structure 86. By so positioning the X-ray unit on top of the support post, the X-ray head 84 is readily available for use from either side of the divider.

As best seen in FIGS. 1 and 2, the countertop 14 extends outwardly from opposite sides of the central enclosure 18. A pair of rear walls 88, 90 (FIG. 1) extend outwardly from the vertical centerline of the sidewalls 20, 22 to the end of the counter 14. The rear walls 88, 90 are connected to lower end walls 92. The end walls extend toward the sides of the divider perpendicular to the rear wall and define with the countertop and rear walls, an enclosure for the area below the sinks 42. A pair of doors 98, 100 may be hingedly connected to the end walls and sidewalls, respectively, to enclose and permit access to the area below the sinks.

Further, the countertop 14, the rear walls and the sidewalls of the central enclosure define mobile dental cart receiving areas 102. The areas 102 are diagonally opposed areas below the countertop. As best seen in FIG. 2, the work area 44 of the dental room divider is in effect a mirror image of the work area 46. The receiving areas 102 are dimensioned so as to receive a mobile dental cart 104. The mobile dental carts are of conventional construction and are generally employed to contain the various general supplies and some of the hand tools typically employed by a dentist. The cabinet structure 10 is designed to provide compact storage for such dental carts.

Figure 5:
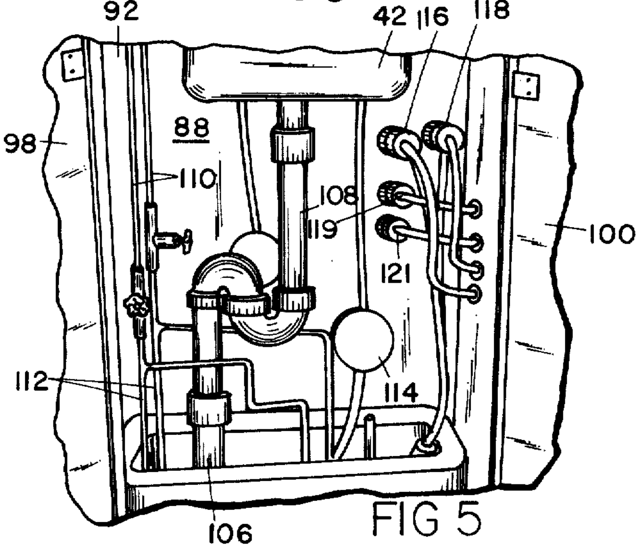
FIG. 5 is an enlarged, fragmentary, elevational view illustrating the various utility connections provided within the structure.

As best seen in FIG. 5, each side of the divider structure 10 may be provided with connections needed to supply the equipment stored within the structure. For example, the sink 42 may be connected to a drain 106 by plumbing conduits 108. Water is supplied to the sink structure by pipes 110 which are connected to a water supply conduit 112. Further, electrical power may be routed into the divider structure at a junction box 114. Connections 116, 118, 119, 121 may be provided for access to a source of oxygen, nitrogen, vacuum or air as required by the equipment and/or hand tools employed by the dentist.

As best seen in FIGS. 2 and 3, the unique cabinet structure in accordance with the present invention would be placed at the approximate centerline of a room. The room is outlined by walls 123, 125 in FIG. 2. Dental chairs indicated schematically at 112, 124 are positioned on opposite sides of the divider 10. The various equipment used by the dentist would then be placed in the enclosures. For example, an electrosurgery unit 124 could be placed within the upper wing enclosure 60. An ultrasonic cleaning unit 128 could be poisitioned within the upper wing enclosure 62. The central portion of the upper enclosure could be employed for the storage of general supplies employed in the practice of dentistry.

The unique structure in accordance with the present invention, therefore, readily divides one room into two dental operating areas. The expensive equipment employed in the practice of dentistry is readily available from both sides of the divider structure thereby permitting use on either side by the same dentist or by separate dentists. The support post structure which is built into the cabinet supports the expensive X-ray unit in a position readily available for use on either side of the divider. Typically, an X-ray control unit may be mounted on an end wall 64 or 66 of the upper enclosure. Conventional hand dental tools may be mounted directly to the cabinet structure or they may be mounted on the mobile dental cart with conduits running into the divider structure where they are connected to the specific source required.

As can therefore be seen, the unique dental room divider in accordance with the present invention substantially alleviates the problems heretofore experienced. The arrangement is relatively simple in structure, easily manufactured, and results in a more efficient use of a dentist's time, the dental equipment and more efficient treatment of the patients. The above description should be considered as that of the preferred embodiment. The true spirit and scope of the present invention will be determined by reference to the appended claims.

The embodiments of the invention in which an exclusive property or privilege is claimed are defined as follows:

1. A dental room divider permitting access to and use of a variety of dental equipment from opposite sides of the divider and thereby eliminating equipment duplication, said divider comprising:

a central enclosure including an elongated horizontally extending countertop and a pair of spaced vertically extending sidewalls supporting said countertop, said countertop extending outwardly beyond each of said sidewalls;

a first access means positioned below said countertop for permitting access to said central enclosure from one side thereof;

a second access means positioned below said countertop opposite said first access means for permitting access to said central enclosure from the other side thereof;

an upper, generally T-shaped enclosure including a pair of spaced vertically extending sidewalls and a pair of outwardly extending wing enclosures supported by said countertop and dividing said countertop into two mirror image, dental operatory work areas on opposite sides of said upper enclosure and extending longitudinally of said countertop, each side of said upper enclosure further including access means secured thereto for permitting access to the interior of said enclosure from opposite sides thereof;

a pair of vertical divider walls positioned on said countertop adjacent the longitudinally centerline thereof and extending outwardly from and perpendicular to the sidewalls of said upper enclosure to a point adjacent the ends of said countertop thereby isolating said dental work areas; and means disposed within one of said enclosures for slidably mounting a piece of dental equipment for movement to either side of said enclosure whereby said equipment may be used by a dentist positioned on either side of said dental room divider.

2. A dental room divider as defined by claim 1 wherein said countertop includes at diagonally opposed locations within the areas of said countertop extending beyond said sidewalls a pair of sink receiving apertures.

3. A dental room divider as defined by claim 2 further including a pair of rear wall members extending outwardly from the vertical centerline of said sidewalls below said countertop and a pair of end walls each extending perpendicular to one of said rear walls in opposite directions to thereby define means for enclosing the space below each of said sink apertures and for defining a dental utility space; and utility means within said utility space for supplying each dental operatory work area with sources of water, air and vacuum.

4. A dental room divider as defined by claim 3 wherein said countertop, said sidewalls, and said rear walls are dimensioned so as to define a pair of diagonally positioned mobile dental cart receiving areas whereby a mobile central cart may be positioned totally under said countertop on each side of said divider.

5. A dental room divider as defined by claim 4 further including an elongated support post extending vertically through said central enclosure and said upper enclosure, said post being adapted to support a swingable X-ray unit whereby said X-ray unit may be used by a dentist on opposite sides of said divider.

6. A dental room divider as defined by claim 5 wherein said first and said second access means each comprises a pair of doors hingedly connected to said central enclosure sidewalls.

7. A dental equipment and general storage structure adapted to contain a wide variety of dental equipment and miscellaneous supplies and thereby permit use of such equipment from either side of said structure, comprising:

an elongated, generally rectangular member defining a general work surface;

a lower storage and enclosure means positioned below said member and for supporting said rectangular member, said lower means including a plurality of access means on opposite sides thereof for permitting access to the interior from both sides of said lower means;

an upper, compartmentalized storage means extending the length of said rectangular member for dividing said member into two work areas and for supporting and storing a variety of dental equipment, said upper storage means including a plurality of access means on opposite sides thereof for permitting access to the equipment from both sides thereof;

a pair of sinks supported by said rectangular member on opposite sides of said upper compartmentalized storage means at diagonally opposed areas;

a plurality of means within said lower storage means for permitting connection to a source of electrical power, a source of oxygen, a source of nitrogen, a source of vacuum and a source of water; and a support post extending vertically through said upper storage means; and an X-ray unit mounted on said post whereby use of said unit may be had from both sides of said structure.

8. A dental equipment and general storage structure adapted to contain a wide variety of dental equipment and miscellaneous supplies and thereby permit use of such equipment from either side of said structure, comprising:

an elongated, generally rectangular member defining a general work surface;

a lower storage and enclosure means positioned below said member and for supporting said rectangular member, said lower means including a plurality of access means on opposite sides thereof for permitting access to the interior from both sides of said lower means;

an upper, compartmentalized storage means extending longitudinally of said rectangular member for dividing said member into two work areas and for supporting and storing a variety of dental equipment, said upper storage means including a plurality of access means on opposite sides thereof for permitting access to the equipment from both sides thereof;

a pair of sinks supported by said rectangular member at opposite ends of said rectangular member, one for use on each side of the structure;

a plurality of means within said lower storage and enclosure means for permitting connection to a source of electrical power, a source of oxygen, a source of nitrogen, a source of vacuum and a source of water; and a support means extending through said upper storage means for supporting an X-ray unit permitting use of the X-ray unit from both sides of said structure.

* * * * *